Figure 1:
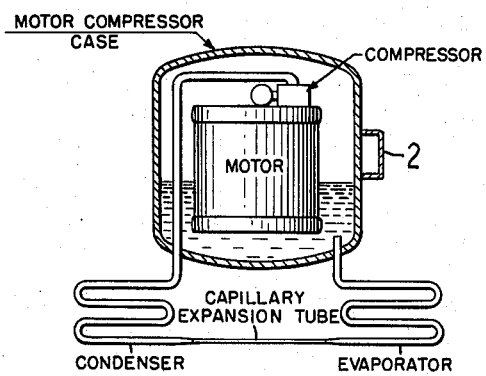

March 29, 1966  A. F. ENEMARK  3,243,679
MOTOR PROTECTIVE MEANS
Filed Jan. 27, 1961

INVENTOR.
ARNE FROMM ENEMARK
BY
ATTORNEY

United States Patent Office 3,243,679
Patented Mar. 29, 1966

3,243,679
MOTOR PROTECTIVE MEANS
Arne Fromm Enemark, Sonderborg, Denmark, assignor to Danfoss ved ingenior Mads Clausen, Elsmark, Denmark, a Danish firm
Filed Jan. 27, 1961, Ser. No. 85,301
Claims priority, application Germany, Jan. 27, 1960, D 19,678
5 Claims. (Cl. 318—221)

This invention relates to motor protective means especially for hermetically sealed motor-compressors for refrigerators or air conditioning units. This kind of equipment or device is normally provided with single phase electric-motors and has an electric unit for starting the motor independent of the motor current especially the current in the running windings. The unit is normally provided with an overload protector formed as a unit responsive to the temperature of the shell or capsule of the hermetically-enclosed compressor. As it is difficult to measure the motor-temperature inside the capsule, and repair of such motor-protector inside the capsule would be expensive, it is therefore normal practice to mount the overload protective device and the starting relay outside the capsule. This invention relates essentially to the mounting of the device, which consists of the starting relay and the overloading protector placed in a housing which is mounted on the outside of the capsule. The overload protector serves to disconnect the electric-motor from the current supply in case of too heavy loading and thereby avoid too high a temperature inside the capsule.

Overload protectors working on a thermoelectric basis, known as bimetallic switches, are already known. These switches will normally be heated in response to the current of the electric motor, but can also be used as a temperature control and thereby serve as a protector and a disconnector of the compressor unit.

Combined protective devices for hermetically sealed compressors, which consist of a starting relay and an overload protective switch assembled in one unit and fixed to the capsule, are also known, but such a unit has the disadvantage that failure in one of the components will necessitate replacement of the whole unit.

For that reason the overload protector and the starting relay has been separated and located side by side on a common mounting plate which is fixed to the capsule and covered by a protective cover.

It has previously been proposed to give the protecting cover the shape of a housing and to fix the starting relay and overload protector inside this housing. In this manner the components will be protected physically. In the same manner the housing can be used as a junction box for the electrical connections. According to this arrangement the overload protector will not be in close contact with the capsule and will therefore only respond to the heat, which is transferred by means of the housing, and this arrangement can only be accepted as a satisfactory manner if the housing fits tightly to the capsule.

Transmission of heat from the capsule to the housing does usually not take place in a satisfactory manner due to that tight fitting or contact of the housing to the capsule cannot be guaranteed without any further arrangements, and the transmission of heat on the other hand will further be reduced by the coating which is applied to the outside of the capsule and housing.

An object of the invention is to develop an arrangement of a protective device for the compressor, that avoids the disadvantages stated above, and secures a direct influence of the temperature of the compressor unit upon the protective switch. This is, according to the invention, obtained by locating the protecting device in a box with one side open. This box is located inside the protective housing and resiliently mounted thereto by means of one or more springs, in such a manner that the open side of the box always is tightly pressed against the capsule. The starting relay may in a know manner be fixed directly to the protecting housing.

The box containing the overload protecting device has a spring, formed as a wirestrap fixed to the outside. The other end of the wirestrap is fixed to the protecting housing. With the exception of the fixing points the wirestrap is so mounted that the box is movable in more than one direction upon the surface of the capsule inside the protecting housing. The wirestrap is so mounted that when the protecting housing is mounted on the capsule, the wirestrap gives sufficient pressure to press the box against the capsule.

Further objects, features and advantages of the present invention will be apparent from the following detailed description there of and from the accompanying drawing, in which:

FIG. 1. shows a refrigerator unit with a motor protective device according to the invention.

Figure 2:
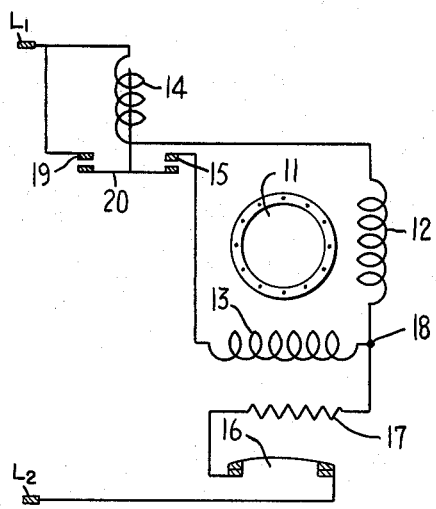

FIG. 2. shows schematically the electric circuit for the motor with the protective device.

Figure 3:
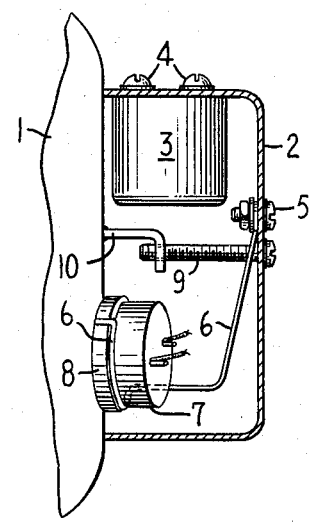

FIG. 3. shows a cross-section of the protecting housing including the protecting overload device and the starting relay.

According to the drawing, FIG. 1 shows a hermetically sealed motor-compressor unit the outlet of which is connected to the condenser coil. The other end of the condenser coil is connected to the capillary expansion tube which is connected to the evaporator coil. The other end of the evaporator coil is connected to the inlet of the capsule. The hermetically sealed compressor unit is only shown schematically and is no part of this invention. On the outside of the capsule is mounted a protecting housing 2 which contains the motor protective device according to the invention. This housing has an open side which is closed by the capsule when the protecting housing is mounted on the capsule of the hermetically sealed compressor.

FIG. 2 shows the electric circuit of the starting relay, motorwindings and the overload protective device according to the invention.

The rotor 11 is schematically illustrated as having squirrelcage bars, which are all connected together at their ends (not shown) to form a plurality of closed conducting loops. The single phase induction motor having a stator comprising two windings 12 and 13, respectively the main or running winding and the starting winding. The running winding 12 is connected in series with the coil of the starting relay 14, the heating element 17 and the bimetallic snapaction switch 16. The end of the starting coil 13 is connected to a common point 18 between the running coil 12 and the heating element 17. The other end of the starting coil 13 is connected to the contact 15 of the starting relay 14, the other contact 19 being connected to the incoming line.

The overload protective device consists of the heating element 17 and the bimetallic snapaction switch 16. This switch responds to the temperature of the heating element and the capsule temperature. The capsule temperature corresponds to the temperature of the electric motor inside the hermetically sealed capsule. The temperature of the heating element responds to the motor current.

When the motor is starting, the current in the running winding 12 is sufficient to energize the starting relay 14 and thereby connect the contact 15 to the contact 19 through the bridge 20. This connects one end of the starting winding 13 to the incoming line $L_1$. The other end of the starting coil 13 is through the protective device connected to the outgoing line $L_2$. When the motor is running, the current will decrease and cause the starting relay 14 to deenergize. The starting coil 13 will then be disconnected from the incoming line $L_1$.

If the motor does not start due to high pressure in the cylinder of the compressor, or some other like factor, the current will increase and heat up the heating element 17, which will cause the bimetallic snapaction switch 16 to disconnect the motorwindings from the outgoing line. The bimetallic snapaction switch will also act upon increasing temperature of the capsule caused by overloading the compressor. The unit is therefore protected in two ways.

In FIGURE 3 the capsule 1 has a protecting housing 2 attached by means of a screw 9 and a metal strip 10, which is welded to the capsule 1. The casing 3 of the starting relay is placed on the upper wall of the protecting housing 2 and mounted by means of the screws 4. The wirestrap 6 is fixed to the endwall of the protecting housing 2 by means of the screw 5 and the other end of the wirestrap 6 partly surrounds the box 7 containing the overload protector. The shoulder 8 serves as a support for the surrounding part of the wirestrap 6. The wirestrap 6 is so mounted that when the protecting housing 2 is placed on the capsule 1, the wirestrap 6 will press the box 7 tightly to the capsule 1, and thereby secure a good heat transmission to the box 7. The starting relay and overload protector may be mounted inside the protecting housing and supplied with the necessary electrical connections before the protecting housing is mounted on the capsule.

It will be obvious that a construction according to this invention is very cheap and simple to produce, and the mounting is effected in a simple manner with only one screw.

What I claim as new and desire to secure by Letters Patent of the United States is:

1. Motor protective means particularly adapted for a hermetically-sealed motor-driven compressor unit for refrigerator and air-conditioning units, and including a motor contained in a hermetically-sealed capsule, comprising, in combination, a starting relay and a motor-overload protective device responsive to the temperature of the capsule, a housing having an open side, said starting relay and said overload protective device being mounted in said housing, and the open side of said housing being engaged with and supported on said capsule, said starting relay being fixedly mounted in the said housing, and resilient mounting means resiliently mounting said overload protective device in said housing, said resilient mounting means having sufficient force to press the temperature-responsive protective device directly against said capsule.

2. Motor protective means particularly adapted for a hermetically-sealed motor-driven compressor unit for refrigerator and air-conditioning units, and including a motor contained in a hermetically-sealed capsule, comprising, in combination, a starting relay and a motor-overload protective device responsive to the temperature of the capsule, a housing having an open side, said starting relay and said overload protective device being mounted in said housing, and the open side of said housing being engaged with and supported on said capsule, said starting relay being fixedly mounted in the said housing, and resilient mounting means resiliently mounting said overload protective device in said housing, said resilient mounting means having sufficient force to press the temperature-responsive protective device directly against said capsule, and comprising a resilient wire strap fastened at one end to the protective housing and supporting said temperature-responsive overload protective device at its other end.

3. Motor protective means particularly adapted for a hermetically-sealed motor-driven compressor unit for refrigerator and air-conditioning units, and including a motor contained in a hermetically-sealed capsule, comprising, in combination, a starting relay and motor-overload protective device responsive to the temperature of the capsule, a housing having an open side, said starting relay and said overload protective device being mounted in said housing, and the open side of said housing being engaged with and supported on said capsule, said starting relay being fixedly mounted in the said housing, and resilient mounting means resiliently mounting said overload protective device in said housing, said resilient mounting means having sufficient force to press the temperature-responsive protective device directly against said capsule, and comprising a resilient wire strap fastened at one end to the protective housing and supporting said temperature-responsive overload protective device at its other end, only the end of said resilient wire strap which is fastened to said housing being fixedly mounted and the remainder of said wire strap being movable in said housing in more than one direction.

4. Motor protective means particularly adapted for a hermetically-sealed motor-driven compressor unit for refrigerator and air-conditioning units, and including a motor contained in a hermetically-sealed capsule, comprising, in combination, a starting relay and a motor-overload protective device responsive to the temperature of the capsule, a housing having an open side, said starting relay and said overload protective device being mounted in said housing, and the open side of said housing being engaged with and supported on said capsule, said starting relay being fixedly mounted in the said housing, and resilient mounting means resiliently mounting said overload protective device in said housing, said resilient mounting means having sufficient force to press the temperature-responsive protective device directly against said capsule, and comprising a resilient wire strap fastened at one end to the protective housing and supporting said temperature-responsive overload protective device at its other end, only the end of said resilient wire strap which is fastened to said housing being fixedly mounted and the remainder of said wire strap being movable in said housing in more than one direction, said resilient wire strap and its mounting in said housing alone providing sufficient pressure to press and hold the overload protective device against said capsule.

5. Motor protective means particularly adapted for a hermetically-sealed motor-driven compressor unit for refrigerator and air-conditioning units, and including a motor contained in a hermetically-sealed capsule, comprising, in combination, a starting relay and a motor-overload protective device responsive to the temperature of the capsule, a housing having an open side, said starting relay and said overload protective device being mounted in said housing, and the open side of said housing being engaged with and supported on said capsule, said starting relay being fixedly mounted in the said housing, and resilient mounting means resiliently mounting said overload protective device in said housing, said resilient mounting means having sufficient force to press the temperature-responsive protective device directly against said capsule, and comprising a resilient wire strap fastened at one end to the protective housing and supporting said temperature-responsive overload protective device at its other end, only the end of said resilient wire strap which is fastened to said housing being fixedly mounted and the remainder of said wire strap being movable in said housing in more than one direction, said resilient wire strap and its mounting in said housing alone providing sufficient pressure to press and hold the overload protective device against said capsule, said temperature-responsive protective device being connected in the motor circuit to be responsive to the motor current as well as to the temperature of the capsule.

No references cited.

ORIS L. RADER, *Primary Examiner.*

JOHN F. COUCH, *Examiner.*

C. E. ROHRER, G. Z. RUBINSON, *Assistant Examiners.*